UNITED STATES PATENT OFFICE.

JACOB F. SCHOELLKOPF, OF BUFFALO, NEW YORK, ASSIGNOR TO SCHOELLKOPF, HARTFORD & HANNA COMPANY, OF BUFFALO, NEW YORK.

WATERPROOF CEMENT AND METHOD OF MAKING THE SAME.

No. 930,697.   Specification of Letters Patent.   Patented Aug. 10, 1909.

Application filed May 11, 1908. Serial No. 432,133.

*To all whom it may concern:*

Be it known that I, JACOB F. SCHOELLKOPF, a citizen of the United States, residing at Buffalo, in the county of Erie and State of New York, have invented a new and useful Improvement in Waterproof Cements and Methods of Making the Same, of which the following is a specification.

This invention relates to the waterproofing of mineral cements, for instance, Portland cement, used for the production of artificial stone or stone-like compositions of matter, by mixing with the cement a substance which renders the cement or the composition of which it forms part waterproof when the cement has set.

In practicing this invention, rosin or colophony is combined with a suitable base, such as lime or baryta, barium oxid or hydrate, forming a salt insoluble in water which, when mixed with the cement, renders the stone or other composition in which the cement is used waterproof. Rosin or colophony contains a large proportion of abietic acid, and this acid may be used instead of the rosin or colophony of commerce, but as the percentage of this acid in rosin or colophony is usually very high it is unnecessary to purify the rosin or separate the acid from the small percentage of accompanying substances. The rosin salt, or abietic acid salt, contemplated by this invention is therefore one which is produced from the rosin or colophony of commerce or from the acid which constitutes the bulk of rosin or colophony.

Two parts, by weight, of quick lime and one part of rosin form a suitable mixture. The quick lime is mixed with the powdered rosin. Water is then added in sufficient quantity to slake the lime. The mass is then thoroughly stirred until the rosin is combined with part of the lime. The resulting substance consists mainly of the abietic acid salt of lime and uncombined calcium hydrate, since the above mentioned proportions provide a considerable excess of lime, which is desirable because the heat liberated in slaking the lime aids in melting the rosin and the uncombined calcium hydrate acts in the resulting mixture as a diluent for the salt. About two per cent. of this product or mixture added to Portland or similar cement will be sufficient to waterproof the stone or composition in which the cement is used. The above mentioned proportion of ingredients may, however, be varied to a considerable extent as the particular use for which the cement is intended may render desirable.

Baryta or barium hydrate is used preferably in the form of a concentrated watery solution in about the proportion of one part, by dry weight, of baryta or barium hydrate and two parts of rosin.

The solution and ground or pulverized rosin are mixed in any suitable manner under the application of heat until the desired combination has been effected. This salt, when dried, may be diluted with dry slaked lime in about the proportion of one part of salt to three parts of lime.

The herein described rosin salts are not only very efficient and reliable insoluble or waterproofing ingredients for admixture with mineral cements but are also very easily produced at comparatively small expense, particularly the lime salt, and therefore very desirable when large quantities of cement in structural work are required to be waterproofed.

The resinate or insoluble resin salt is uncombined with clay or similar matter foreign to the base of the resinate which would reduce the waterproofing action of the resinate. A comparatively small proportion of the resinate or resin salt will there be sufficient for admixture with the mineral cement. For illustration, in the example hereinbefore stated in which the lime salt of rosin is used, the addition of two per cent. of the mixture of rosin salt of lime and uncombined lime is sufficient for the purpose, although this mixture contains only about 0.66 per cent. of rosin as compared with the mineral cement to which the mixture is added.

I claim as my invention:

1. The herein described dry cement comprising a mineral cement and an insoluble resin salt uncombined with material foreign to the base of said salt, substantially as set forth.

2. The herein described dry cement comprising a mineral cement and an insoluble resin salt of lime uncombined with material foreign to the base of said salt, substantially as set forth.

3. The herein described dry cement comprising a mineral cement and an insoluble resin salt, said dry cement containing less than two per cent. of resin, substantially as set forth.

Witness my hand in the presence of two subscribing witnesses.

JACOB F. SCHOELLKOPF.

Witnesses:
E. C. HARD,
C. B. HORNBECK.